United States Patent
Dhanda et al.

(10) Patent No.: US 9,398,561 B2
(45) Date of Patent: Jul. 19, 2016

(54) OPERATION OF DEVICES SUPPORTING MULTIPLE SIMS

(71) Applicant: QUALCOMM Incorporated, San Diego, CA (US)

(72) Inventors: Mungal Singh Dhanda, Slough (GB); Subbarayudu Mutya, Hyderbad (IN); Venkata Raji Reddy Kanthala, Hyderabad (IN); Simon Walke, Basingstoke (GB)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/502,504

(22) Filed: Sep. 30, 2014

(65) Prior Publication Data
US 2015/0018021 A1   Jan. 15, 2015

Related U.S. Application Data

(62) Division of application No. 13/365,008, filed on Feb. 2, 2012, now Pat. No. 8,880,106.

(60) Provisional application No. 61/439,260, filed on Feb. 3, 2011.

(51) Int. Cl.
*H04W 68/02* (2009.01)
*H04W 4/08* (2009.01)
*H04W 28/04* (2009.01)

(52) U.S. Cl.
CPC ............... *H04W 68/02* (2013.01); *H04W 4/08* (2013.01); *H04W 28/044* (2013.01); *H04W 28/046* (2013.01)

(58) Field of Classification Search
CPC ...................................................... H04W 68/02
See application file for complete search history.

(56) References Cited

U.S. PATENT DOCUMENTS

| | | | |
|---|---|---|---|
| 6,236,856 B1 * | 5/2001 | Abbadessa | 455/423 |
| 6,728,537 B1 * | 4/2004 | Abdesselem et al. | 455/434 |
| 2003/0125073 A1 | 7/2003 | Tsai et al. | |
| 2003/0181216 A1 | 9/2003 | Tsai et al. | |

(Continued)

FOREIGN PATENT DOCUMENTS

| | | |
|---|---|---|
| CN | 1820518 A | 8/2006 |
| EP | 1035749 A1 | 9/2000 |

(Continued)

OTHER PUBLICATIONS

3rd Generation Partnership Project; Technical Specification Group GSM/EDGE Radio Access Network; Multiplexing and multiple access on the radio path (Release 1997),3GPP TS 05.02 ,Apr. 2001,V6.9.2.

(Continued)

*Primary Examiner* — Mazda Sabouri
(74) *Attorney, Agent, or Firm* — Michael J. DeHaemer, Jr.

(57) ABSTRACT

Exemplary embodiments are directed to operation of a device supporting multiple SIMs. A method may include detecting a paging collision scenario between a first subscription and at least a second subscription. The method may further include modifying a page reading operation of at least one of the first subscription and the at least a second subscription to avoid a paging collision between the first subscription and the at least a second subscription. Other aspects, embodiments, and features are also claimed and described in the application.

18 Claims, 9 Drawing Sheets

(56) References Cited

U.S. PATENT DOCUMENTS

| | | |
|---|---|---|
| 2005/0037746 A1 | 2/2005 | Ramalho et al. |
| 2007/0015523 A1 | 1/2007 | Prakash et al. |
| 2009/0215472 A1 | 8/2009 | Hsu |
| 2009/0215473 A1 | 8/2009 | Hsu |
| 2009/0305728 A1 | 12/2009 | Huang et al. |
| 2010/0202430 A1 | 8/2010 | Chin et al. |
| 2010/0203906 A1 | 8/2010 | Fang et al. |
| 2010/0279698 A1 | 11/2010 | Wong |
| 2011/0038348 A1* | 2/2011 | Borsella et al. ............... 370/331 |
| 2011/0077031 A1 | 3/2011 | Kim et al. |
| 2011/0090874 A1 | 4/2011 | Yang et al. |
| 2013/0035120 A1 | 2/2013 | Dhanda et al. |
| 2015/0057034 A1 | 2/2015 | Dhanda et al. |

FOREIGN PATENT DOCUMENTS

| | | |
|---|---|---|
| JP | 2001501056 A | 1/2001 |
| JP | 2003189361 A | 7/2003 |
| JP | 2003521135 A | 7/2003 |
| JP | 2007110607 A | 4/2007 |
| WO | WO-9812887 A1 | 3/1998 |
| WO | 0042807 A1 | 7/2000 |
| WO | WO-2006138625 A2 | 12/2006 |
| WO | 2010062784 A1 | 6/2010 |
| WO | 2010093825 | 8/2010 |
| WO | 2010093874 | 8/2010 |
| WO | 2012122302 A2 | 9/2012 |

OTHER PUBLICATIONS

European Search Report—EP14151468—Search Authority—Munich—Apr. 10, 2014.

European Search Report—EP14151470—Search Authority—Munich—Apr. 1, 2014.

European Search Report—EP14151476—Search Authority—Munich—Mar. 27, 2014.

International Search Report and Written Opinion—PCT/US2012/023865—ISA/EPO—Jun. 21, 2012.

Nokia., et al., "Introduction of Dual Control Channel Mode (DCCM/A)," 3GPP TSG-GERAN#6 GP-011569,Aug. 27, 2001.

Response to Second Written Opinion Under PCT Article 34—International Searching Authority—PCT/US2012/023865—Apr. 24, 2013.

* cited by examiner

OPERATION OF DEVICES SUPPORTING MULTIPLE SIMS

PRIORITY CLAIM AND RELATED APPLICATION

This application is a divisional of U.S. patent application Ser. No. 13/365,008 filed on Feb. 2, 2012, and titled "OPERATION OF DEVICES SUPPORTING MULTIPLE SIMS" which application is a non-provisional application claiming priority under 35 U.S.C. §119(e) to U.S. Patent Application No. 61/439,260 filed on Feb. 3, 2011, and titled "OPERATION OF DEVICES SUPPORTING MULTIPLE SIMS," which applications are expressly incorporated herein in their entirety by this reference.

TECHNICAL FIELD

Embodiments of the present invention relate generally to wireless communication. More specifically, the present invention relates to devices, methods, articles of manufacture, and computer-readable medium for supporting multiple subscriber identify modules (SIMS) with a single receiving device. Some embodiments can be incorporated on communication devices such as mobile or fixed communication equipment.

BACKGROUND

Sometimes it may not be possible for a mobile device, which includes multiple subscriber identity modules (SIMs) and a single receiver, to simultaneously receive paging channels for two subscriptions. If both subscriptions are from a single operator, the mobile device may likely "camp on" a single cell for both subscriptions. In such a case, paging messages of two paging channels may collide and, thus, only one subscription may be able to receive a paging message. The end result is that mobile terminated calls may not succeed for the other subscription, thus, leading to poor user experience. This problem can also occur when each subscription of a mobile device is "camped on" different cells and the timing of the paging channel for one subscription collides with that of another subscription.

A need exists for methods, devices, and computer-readable medium to enhance wireless communication systems. More specifically, a need exists for methods, devices, and computer-readable medium for reducing paging collisions between multiple subscriptions associated with a single receiving device.

BRIEF SUMMARY OF EXEMPLARY EMBODIMENTS

Several embodiments of the present invention are summarized below and further below are further descriptive details. Features of the present invention address the issues discussed above thus enabling communication devices, methods, and systems capable of reducing paging collisions between multiple subscriptions associated with a single receiving device.

In a communications network comprising multiple communication devices wherein the communication devices can communicate with at least one other communication device, an article of manufacture comprising: one or more processors configured to detect a paging collision scenario between a first subscription and a second subscription; and modify a page reading operation of at least one of the first subscription and the second subscription to avoid a paging collision between the first subscription and the second subscription.

A communications method can also enable reduction of paging collisions. Such a method can generally comprise detecting a paging collision scenario between a first subscription and a second subscription, and modifying a page reading operation of at least one of the first subscription and the second subscription to avoid a paging collision between the first subscription and the second subscription.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION OF EXEMPLARY & ALTERNATIVE EMBODIMENTS

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein. Also, in some instances algorithms for use with some embodiments as shown in flow chart form and also discussed in corresponding text. This text can be used to implement code (e.g., if/then/else statements) for implementing features of embodiments of the present invention.

The term "terminal," as used herein, may be fixed or mobile and may be referred to as a mobile station, a user equipment (UE), a wireless communication device, or some other terminology. For example only, a terminal may comprise a mobile telephone, a Smartphone, a tablet PC, a desktop or a laptop computer, a personal digital assistant (PDA), or any other computing devices with such capabilities. For simplicity, the description provided herein primarily references terminals; however, such references should be expansively construed to refer to any wireless telecommunications devices with comparable functionality or other devices containing communication components.

As will be understood by a person having ordinary skill in the art, Global System for Mobile communications (GSM) is a widely used technology for wireless telecommunications. GSM devices may incorporate a Subscriber Identity Module (SIM) card, which stores information needed to enable a GSM Network Provider to identify a device (e.g., a phone) user (i.e., a subscriber), allocate a telephone number for the device, and bill costs associated with the device. If a SIM card is transferred from one GSM device to another GSM device, the identity of the subscriber is also transferred.

For various reasons, it is becoming increasingly popular for individuals to have more than one GSM subscription. Although an increasing number of people possess multiple SIMs, GSM devices typically include only one SIM card. Therefore, a user with dual SIMs may either switch SIM cards when using a different GSM account for a single device, or have two GSM devices. Each of these solutions has proven to be costly and inconvenient to a device user.

Figure 1A:
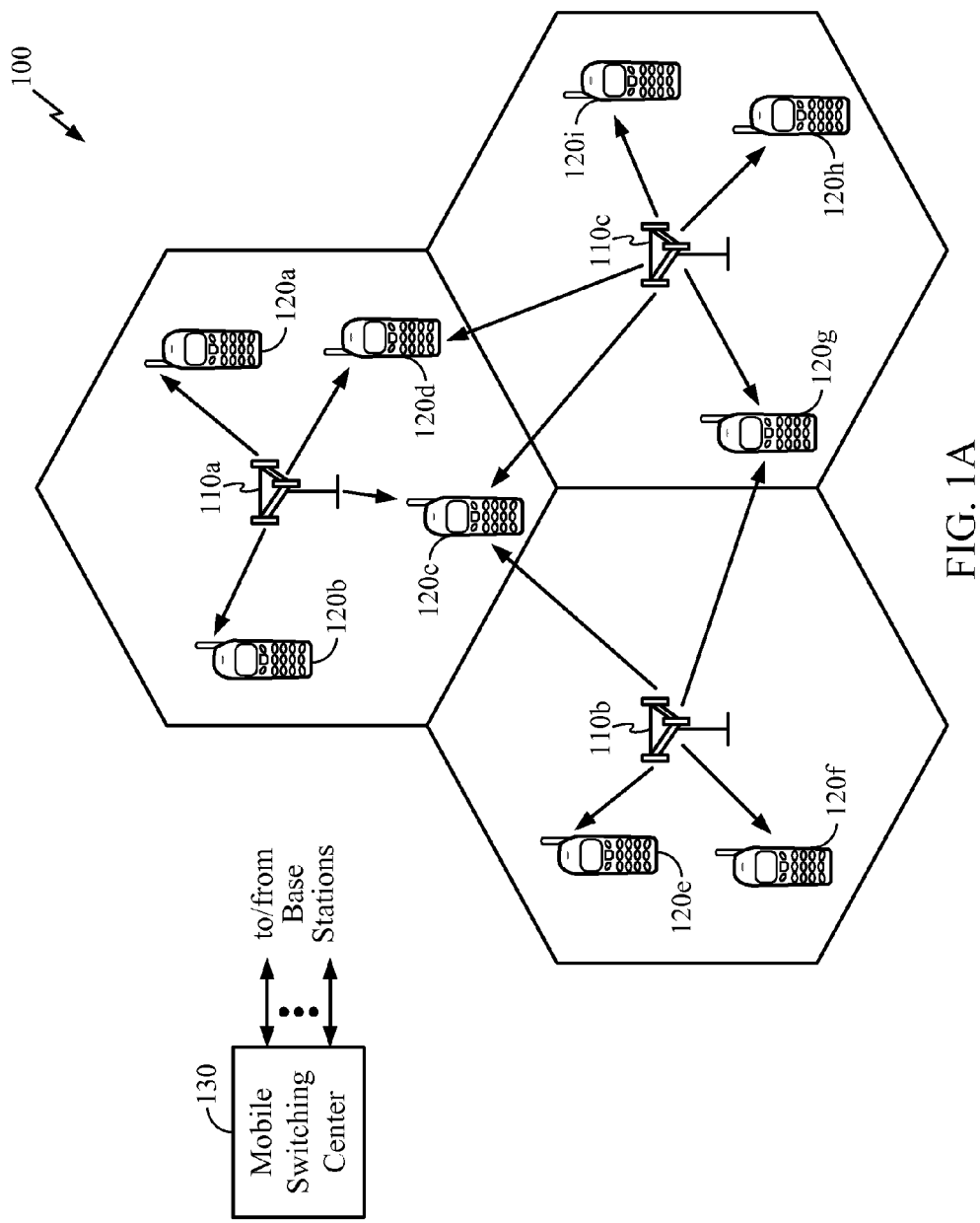
FIG. 1A shows a wireless communication system.

FIG. 1A shows a wireless communication system 100 including a plurality of base stations 110 (i.e., base stations 110a-110c) that provide communication for a plurality of terminals 120 (i.e., terminals 120a-120i). A "base station" is a fixed station and may also be referred to as a base transceiver subsystem (BTS), a Node B, an access point, or some other terminology. Terminals 120 may be dispersed throughout communication system 100. A mobile switching center (MSC) 130 may be configured to couple to each base station 110, provide coordination and control for each base station 110, and further control the routing of data to/from terminals 120 served by base stations 110. A mobile switching center may also be referred to as a radio network controller (RNC) or some other terminology.

System 100 can incorporate various communication technologies. For example, system 100 may comprise a time-division multiple access (TDMA) system that may implement one or more TDMA standards such as GSM. System 100 may also comprise a Code Division Multiple Access (CDMA) system that may implement one or more CDMA standards, such as Wideband CDMA (W-CDMA), IS-2000, IS-856, IS-95, and so on. These standards are well known in the art.

The techniques described herein for performing early decoding of a control channel may be used for various wireless communication systems. Moreover, these techniques may be used for various control channels, such as the broadcast control channel and the paging channel in GSM. For clarity, these techniques are specifically described below for the paging channel in a GSM system.

Figure 1B:
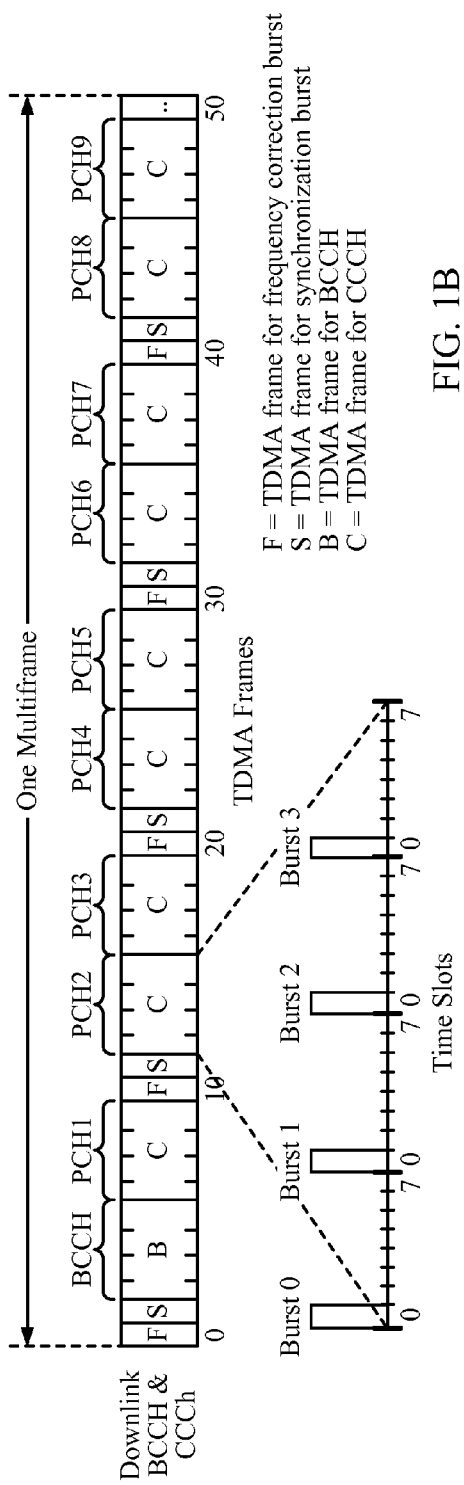
FIG. 1B shows channel organization for a broadcast control channel (BCCH) and a common control channel (CCCH) in Global System for Mobile communications (GSM).

FIG. 1B shows an exemplary channel organization for the broadcast control channel (BCCH) and the common control channel (CCCH) in GSM, wherein a timeline for downlink transmission is divided into multiframes. For the BCCH and CCCH control channels, each multiframe is partitioned into 51 TDMA frames, which are labeled as TDMA frames 0 through 50. The BCCH is sent in TDMA frames 2, 3, 4, and 5 of each multiframe. The CCCH may be viewed as including nine paging channels PCH 1 through PCH 9, as shown in FIG. 1B. Each paging channel PCH serves a respective group of terminals. Each terminal is assigned to one of the paging channels on every Nth occurrence of the 51-multiframe structure where N ranges from 2 to 9. Paging messages, if any, for each terminal are sent on the assigned paging channel.

In GSM, each TDMA frame is further partitioned into 8 time slots, which are labeled as time slots 0 through 7. Time slot 0 is used for the control channels and the other seven times slots 1 through 7 are used for traffic channels. A message for the BCCH is transmitted in time slot 0 of TDMA frames 2, 3, 4, and 5. A message for the first paging channel, PCH 1, is transmitted in time slot 0 of TDMA frames 6, 7, 8, and 9. Messages for the other paging channels are transmitted in time slot 0 of their associated TDMA frames, as shown in FIG. 1B. The transmission in each time slot is referred to as a "burst" in GSM.

Other control channel organizations may also be used to carry the BCCH and CCCH. Channel organizations for the BCCH and CCCH are described in detail in 3GPP TS 05.01, which is publicly available.

Figure 2:
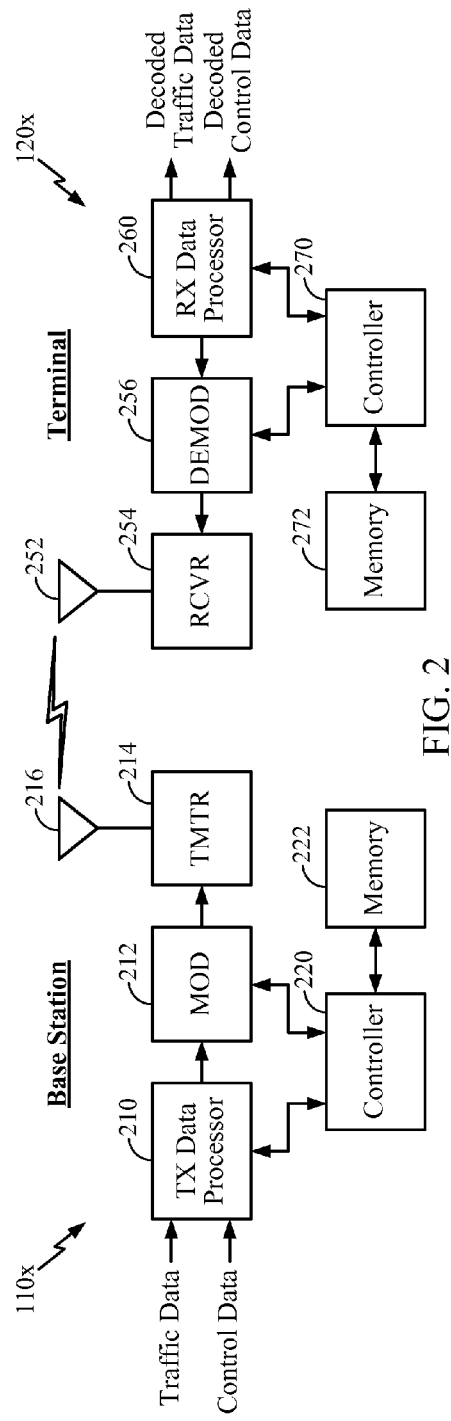
FIG. 2 shows a block diagram of a base station and a terminal

FIG. 2 shows a block diagram of a base station 110x and a terminal 120x. Base station 110x may comprise one of the base stations illustrated in FIG. 1A, and terminal 120x may comprise one of the terminals in FIG. 1A. On the downlink, at base station 110x, a TX data processor 210 may receive traffic data for traffic channels and control data for control channels. TX data processor 210 may format, code, and interleave the data for each traffic/control channel based on the coding and interleaving schemes specified for that channel and provide output data for the traffic/control channel. A modulator (MOD) 212 may then receive and process the output data for all traffic and control channels, as specified by GSM, and provide modulated data. A transmitter unit (TMTR) 214 may process the modulated data to generate a downlink signal, which is then transmitted via an antenna 216 to the terminals (e.g., terminal 120x).

At terminal 120x, a downlink signal transmitted by base station 110x may be received by an antenna 252 and provided to a receiver unit (RCVR) 254. Terminal 120x may receive and process multiple downlink signals from multiple base stations. For simplicity, the processing for only one downlink signal from base station 110x is described below. Receiver unit 254 may condition and digitize the received signal from antenna 252 and provide a stream of data samples. A demodulator (DEMOD) 256 may then process the data samples and provide demodulated data. An RX data processor 260 may deinterleave and decode the demodulated data to recover the traffic and control data transmitted by base station 110x. The processing by demodulator 256 and RX data processor 260 is complementary to that performed by modulator 212 and TX data processor 210, respectively, at base station 110x.

Controllers 220 and 270 may be configured to direct the operation at base station 110x and terminal 120x, respectively. Memory units 222 and 272 provide storage for program codes and data used by controllers 220 and 270, respectively. For simplicity, FIG. 2 only shows the processing units for downlink transmission and does not show all of the processing units normally present at base station 110x and terminal 120x.

As will be appreciated by a person having ordinary skill in the art, a GSM device may include a SIM (Subscriber Identity Module) card, which stores information needed for a GSM Network Provider to establish an identity of device user.

The description herein is related to enhancing paging channel reception for a GSM mobile device (i.e., mobile station) having more than one SIM and only a single receiver. The exemplary embodiments described herein provide solutions to paging collision scenarios for various configurations of GSM EDGE Radio Access Network (GERAN) modes of operation. It is noted that the exemplary embodiments described herein assume that a mobile device includes a single receiver capable of monitoring only one GSM frequency at any one time.

Broadcast parameters, as well as a subscription identity (IMSI), may define which specific radio blocks a mobile device should monitor for paging reception while operating in a "Normal Page" mode. One parameter, which is referred to as a Common Control Channel configuration "CCCH-CONF," may define whether a network is using a combined (CCCH+SDCCH) configuration or a non-combined configuration. In the case of a non-combined configuration, this parameter may also define the number of common control on a BCCH frequency. A first common control channel may be on a timeslot 0, a second common control channel may be on a timeslot 2, a third common control channel may be on a timeslot 4, and a fourth common control channel may be on a timeslot 6. At a minimum, one common control channel exists.

Another parameter, referred to as "BS-AG-BLKS-RES," may define a number of downlink radio blocks reserved exclusively for an Access Grant Channel (AGCH). BS-AG-BLKS-RES may range from 0-7 in a case of non-combined CCCH and 0-3 in a case of combined CCCH. Yet, another parameter, which is referred to as "BS-PA-MFRMS," may define a repetition rate of the paging blocks for a mobile device. "BS-PA-MFRMS" may have a range of 2-9 51-multiframes.

Furthermore, additional parameters, as noted below, together with the subscription identity (IMSI), may be used by a mobile station to compute the exact radio blocks necessary to monitor for a subscription. These additional parameters include a common control channel configuration group "CCCH_GROUP," a paging group "PAGING_GROUP," and a paging block index "PAGING_BLOCK." "CCCH_GROUP" may define which common control channel is used to monitor for paging, AGCH, and for sending RACHs. "CCCH_GROUP" may be within the range of 0-3. "PAGING_GROUP" may define which 51-multiframe to monitor for paging purposes and "PAGING_BLOCK" may define which radio block in a 51-multiframe to monitor for paging purposes.

Figure 3:
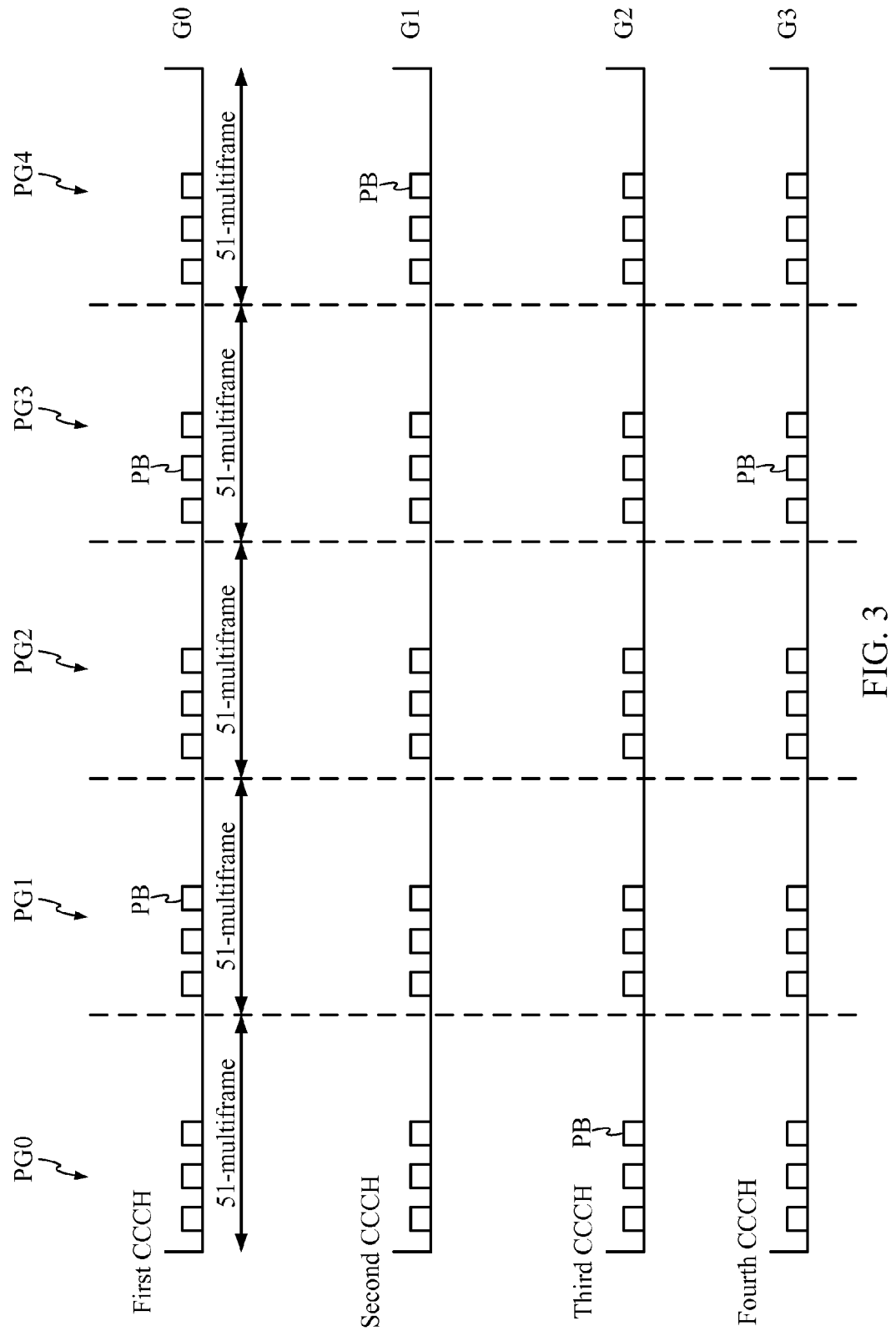
FIG. 3 is a diagram depicting common control channel configuration groups, paging groups, and paging block indices.
Figure 4A:
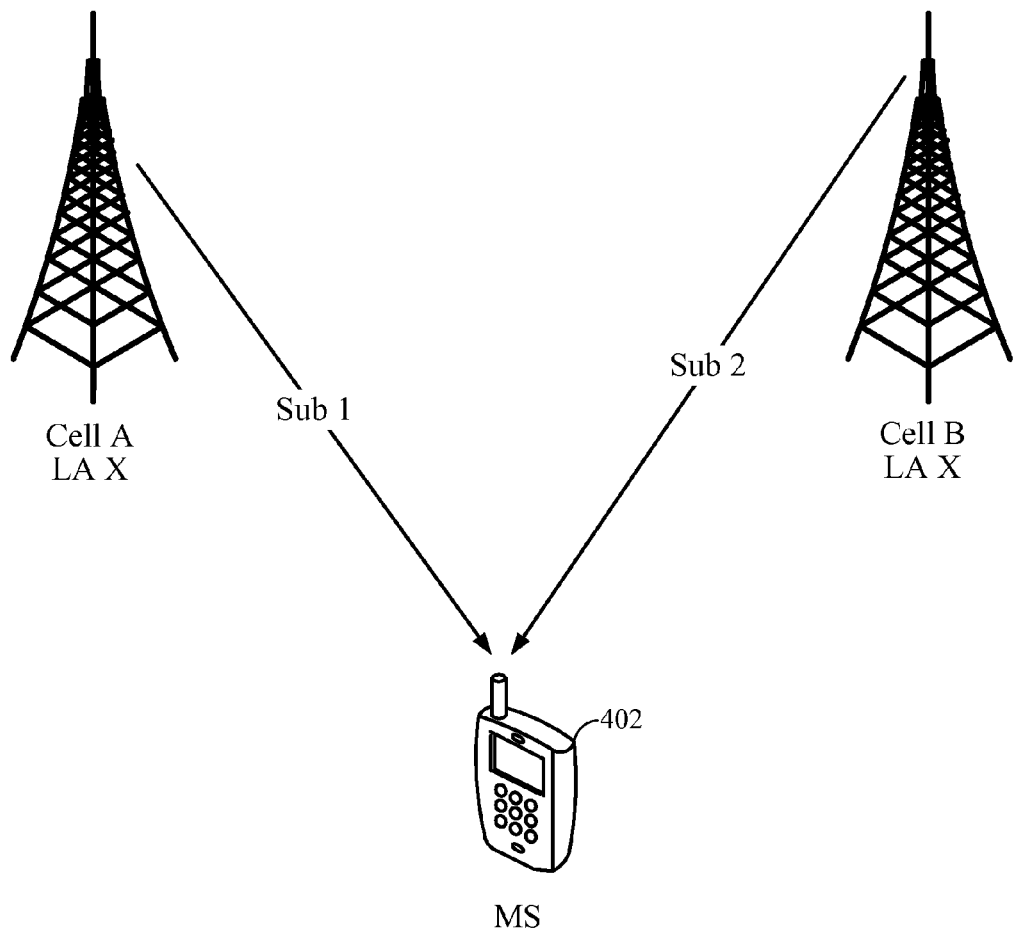
FIG. 4A illustrates a system including a mobile station having a first subscription on a first cell and a second subscription on a second cell.
Figure 4B:
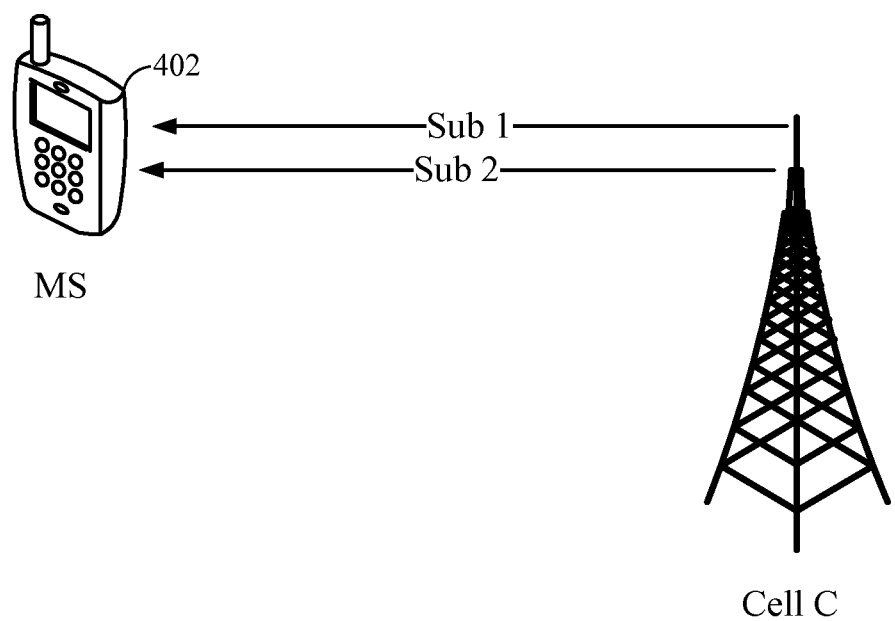
FIG. 4B illustrates a system including a mobile station having dual subscriptions on a single cell.

FIG. 3 is a diagram depicting common control channel configuration groups "CCCH_GROUP" G0-G3, paging groups "PAGING_GROUP" PG0-PG4, and paging block indices "PAGING_BLOCK" PB for a single paging sub-channel PSC. As will be appreciated by a person having ordinary skill in the art, each PAGING_BLOCK PB may comprises 1 to 4 mobile pages. FIG. 4A illustrates a mobile station 402 having a first subscription Sub 1 on a Cell A and a second subscription Sub 2 on a Cell B. FIG. 4B illustrates mobile station 402 having both first subscription Sub 1 and second subscription Sub 2 on a single Cell C.

Figure 5:
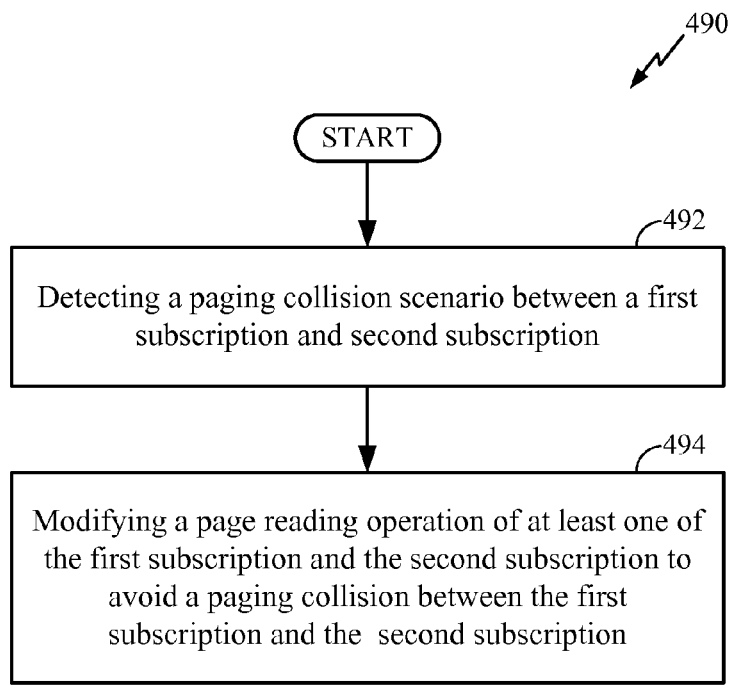
FIG. 5 is a flowchart depicting a method, according to an exemplary embodiment of the present invention.

FIG. 5 is a flowchart illustrating a method 490, in accordance with one or more exemplary embodiments. Method 490 may include detecting a paging collision scenario between a first subscription and at least a second subscription (depicted by numeral 492). Method 490 may further include modifying a page reading operation of at least one of the first subscription and the at least a second subscription to avoid a paging collision between the first subscription and the at least a second subscription (depicted by numeral 494).

Various paging collision scenarios, as well as contemplated solutions to the collision scenarios, will now be described with reference to FIGS. 3-10. In one scenario, two subscriptions (e.g., subscriptions Sub 1 and Sub 2) are assigned to different networks. More specifically, as an example, subscription Sub 1 is served by a first network and subscription Sub 2 is served by second, different network. It is noted that this scenario may be possible if each subscription is served by a different network (i.e., different physical network provider). In this scenario, in the event of collisions, alternating subscription page blocks may be read. More specifically, a PAGING_BLOCK PB for subscription Sub 1 may be read during a one paging period of a paging sub-channel and a PAGING_BLOCK PB for subscription Sub 2 may be read during a subsequent paging period of a paging sub-channel.

Figure 6:
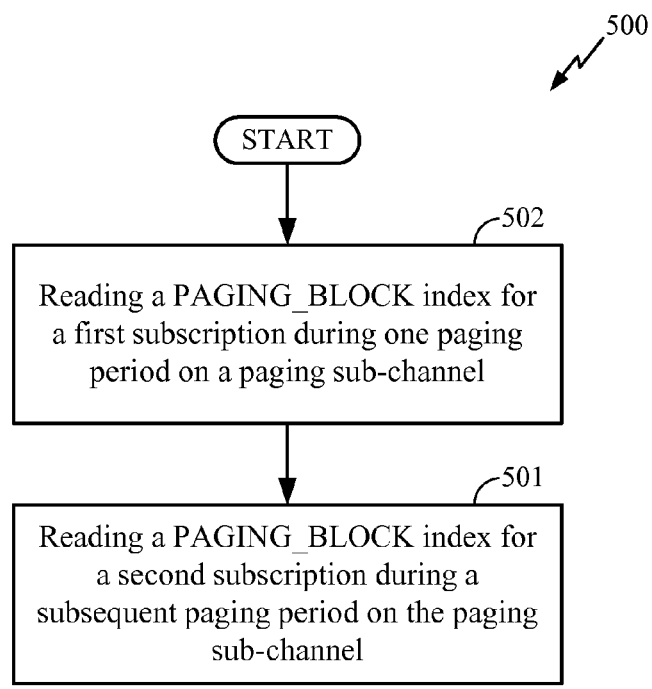
FIG. 6 is a flowchart depicting another method, in accordance with an exemplary embodiment of the present invention.

FIG. 6 is a flowchart illustrating a method 500, in accordance with one or more exemplary embodiments. Method 500 may include reading a PAGING_BLOCK for a first subscription during one paging sub-channel (depicted by numeral 502). Method 500 may further include reading a PAGING_BLOCK for a second subscription during a subsequent paging sub-channel (depicted by numeral 504).

In another scenario, two subscriptions may be assigned to the same network but are associated with different cells belonging to a single location area. More specifically, as an example, subscription Sub 1 may be assigned to Cell A and subscription Sub 2 may be assigned to Cell B, wherein subscription Sub 1 and subscription Sub 2 are assigned to a common network and Cell A and Cell B are located within a single location area. It is noted that this scenario may occur if one subscription is unable to "camp on" the same cell as the other subscription. Further, in this scenario, the two cells are configured in a manner such that a receiver of mobile station 402 is unable to monitor both paging blocks. One contemplated solution to this scenario includes reading alternating subscription page blocks in the event of collisions. More specifically, a PAGING_BLOCK PB for subscription Sub 1 may be read during a one paging sub-channel (e.g., paging sub-channel PSC) and a PAGING BLOCK PB for subscription Sub 2 may be read during a subsequent paging sub-channel.

Further, because a network may not know which cell a mobile device is linked to at any one time, for mobile terminated operations, a voice call network may page a mobile device in an entire location area. For example, with specific reference to FIG. 4A, it is assumed that subscription Sub 1 is "camped on" Cell A and subscription Sub 2 is "camped on" Cell B. Moreover, Cell A and Cell B belong to the same network and are in the same location area. Another contemplated solution includes computing the common control channel (CCCH) group "CCCH_GROUP" (i.e., one of groups G0-G3) and paging group "PAGING GROUP" (i.e., one of PG0-PG4) for each of subscription A and subscription B using parameters from Cell A, as will be appreciated by a person having ordinary skill in the art. If the CCCH_GROUP and the PAGING_GROUP is the same for each cell, then mobile device 402 may share paging information from Cell A. Similarly, the CCCH_GROUP and PAGING_GROUP for each of subscription Sub 1 and subscription Sub 2 using parameters from Cell B may be computed. If the CCCH_GROUP and the PAGING_GROUP is the same for each cell, then mobile device 402 may share paging information from Cell B.

Figure 7:
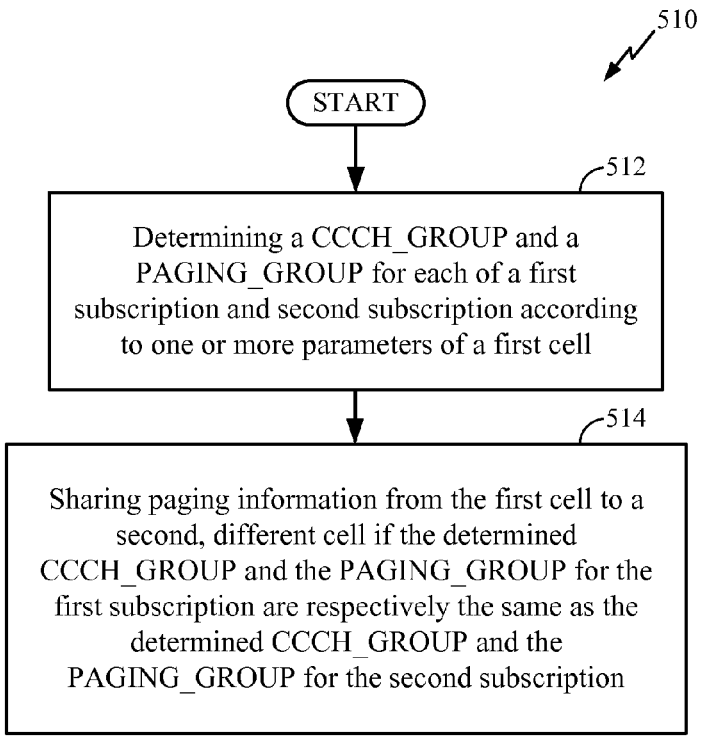
FIG. 7 is a flowchart depicting another method, according to an exemplary embodiment of the present invention.

FIG. 7 is a flowchart illustrating a method 510, in accordance with one or more exemplary embodiments. Method 510 may include determining a CCCH_GROUP and a PAGING_GROUP for each of a first subscription and a second subscription according to one or more parameters of a first cell (depicted by numeral 512). Method 500 may further include sharing paging information from the first cell to a second, different cell if a determined CCCH_GROUP and a PAGING_GROUP for the first subscription are respectively the same as a determined CCCH_GROUP and a PAGING_GROUP for the second subscription (depicted by numeral 514).

Another scenario includes two subscriptions assigned to the same network but different cells belonging to two different location areas. More specifically, as an example, subscription Sub 1 may be assigned to Cell A and subscription Sub 2 may be assigned to Cell B, wherein Cell A is in a different location area than Cell B. This scenario may result from one subscription being unable to "camp on" the same cell as the other subscription. A contemplated solution to collisions involved in this scenario may include reading alternating subscription page blocks. More specifically, a PAGING_BLOCK PB for subscription Sub 1 may be read during a one paging sub-channel (e.g., paging sub-channel PSC) and a PAGING_BLOCK PB for subscription Sub 2 may be read during a subsequent paging sub-channel.

In another scenario, subscriptions (e.g., subscription Sub 1 and subscription Sub 2) may be "camped on" the same cell (e.g., Cell C; see FIG. 4B) but have different common control channel (CCCH) groups "CCCH_GROUP" (G0-G3). This scenario may be possible due to different IMSIs. It is further noted that design limitations may not allow for paging reception of more than one timeslot within a single radio block and, therefore, persistent collisions may occur. A contemplated solution to collisions involved in this scenario may include alternating subscription page block reading. More specifically, a PAGING_BLOCK PB for subscription Sub 1 may be read during a one paging sub-channel (e.g., paging sub-channel PSC) and a PAGING_BLOCK PB for subscription Sub 2 may be read during a subsequent paging sub-channel. It is noted that in this scenario, and associated solution, paging group and paging block index may be irrelevant.

Another scenario may include subscriptions (e.g., subscription Sub 1 and subscription Sub 2) "camped on" the same cell (e.g., Cell C) and within the same CCCH_GROUP (G0-G3) and the same PAGING_GROUP (PG0-PG4). This scenario may be possible due to different IMSIs. It is noted that both subscriptions (e.g., subscription Sub 1 and subscription Sub 2) may be monitoring the same paging block. A contemplated solution may entail sharing paging received for one subscription with the other subscription. Stated another way, for example, information received with subscription Sub 1 may be shared with subscription Sub 2. Even serving cell and neighbor cell power measurements and system information may be shared from one subscription to another subscription. Sharing all information may prevent reselection by one subscription only.

Figure 8:
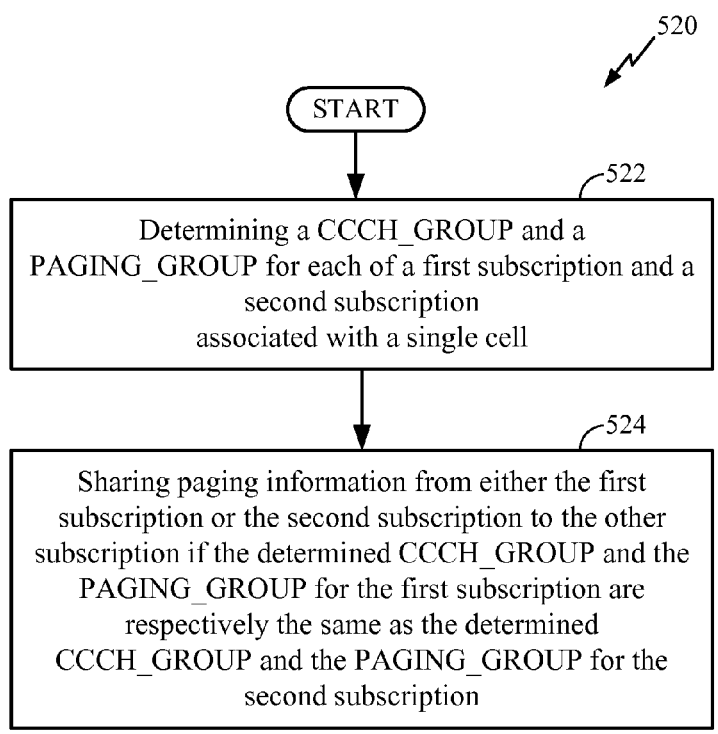
FIG. 8 is a flowchart depicting another method, according to an exemplary embodiment of the present invention.

FIG. 8 is a flowchart illustrating a method 520, in accordance with one or more exemplary embodiments. Method 520 may include determining a CCCH_GROUP and a PAGING_GROUP for each of a first subscription and a second subscription associated with a single cell (depicted by numeral 522). Method 520 may further include sharing paging information from either the first subscription or the second subscription to the other subscription if the determined CCCH_GROUP and a PAGING_GROUP for the first subscription are respectively the same as the determined CCCH_GROUP and a PAGING_GROUP for the second subscription (depicted by numeral 524).

Yet another scenario may include subscriptions (e.g., subscription Sub 1 and subscription Sub 2) "camped on" the same cell (e.g., Cell C) and within the same CCCH_GROUP (G0-G3) but within different PAGING_GROUPS (PG0-PG4). This scenario may be possible due to different IMSIs. In conventional system designs, paging collision may occur when page blocks for two subscriptions are adjacent each other (i.e., paging index different by 1). This is due to the fact that two paging channels are handled independently by layer L1 and switching between the two channels may require more than one TDMA, hence, it may not be possible to monitor the radio block immediately after the paging block.

One contemplated solution to collisions involved in this scenario may include alternating subscription page block reading. More specifically, a PAGING_BLOCK PB for subscription Sub 1 may be read during a one paging sub-channel (e.g., paging sub-channel PSC) and a PAGING_BLOCK PB for subscription Sub 2 may be read during a subsequent paging sub-channel. Another contemplated solution may include reading two consecutive pages, which may require a design modification. It is noted that if at least one radio block gap exists between two page blocks, it may be possible to receive both paging blocks.

Figure 9:
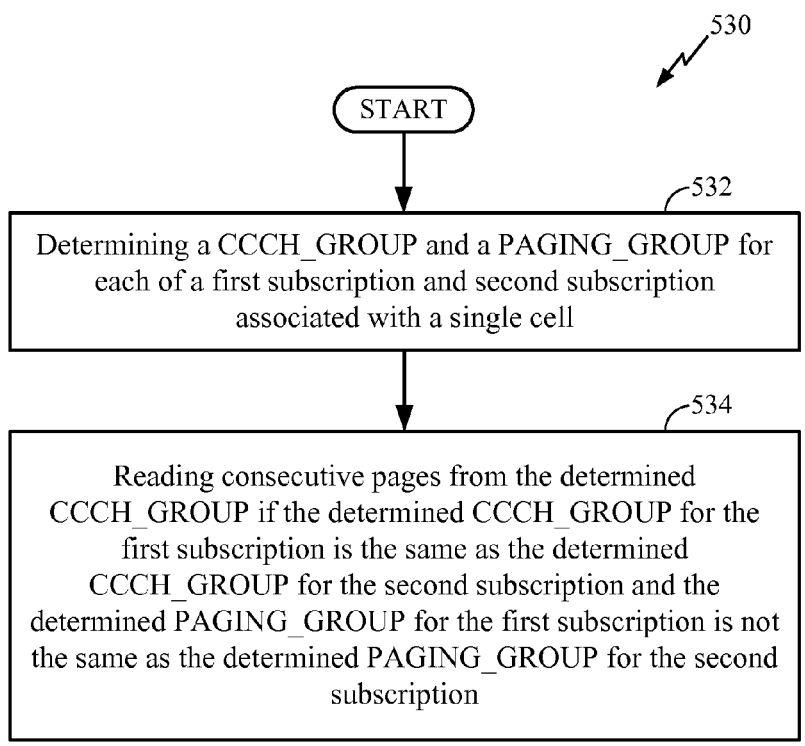
FIG. 9 is a flowchart depicting another method, in accordance with an exemplary embodiment of the present invention.

FIG. 9 is a flowchart illustrating a method 530, in accordance with one or more exemplary embodiments. Method 530 may include determining a CCCH_GROUP and a PAGING_GROUP for each of a first subscription and a second subscription associated with a single cell (depicted by numeral 532). Method 530 may further include reading consecutive pages within the determined CCCH_GROUP if the determined CCCH_GROUP for the first subscription is the same as the determined CCCH_GROUP for the second subscription and the determined PAGING_GROUP for the first subscription is not the same as the determined PAGING_GROUP for the second subscription (depicted by numeral 534).

With specific reference to FIG. 4A, an example operation of mobile device 402 with dual subscription camped on two different cells (i.e., Cell A and Cell B) will now be described. In this example, subscription Sub 1 is camped on Cell A and subscription Sub 3 is camped on Cell B. Mobile device 402 may compute the CCCH_GROUP (G0-G3) and PAGING_GROUP (PG0-PG4) for subscription A and subscription B for each of Cell A and Cell B, as will be appreciated by a person having ordinary skill in the art.

A first parameter CCCH_GROUP _1A is a CCCH_GROUP for subscription Sub 1 using broadcast parameters from Cell A and a second parameter PAGING_GROUP_ 1A is a PAGING_GROUP for subscription Sub 1 using broadcast parameters from Cell A. A third parameter CCCH_GROUP_1B is a CCCH_GROUP for subscription Sub 1 using broadcast parameters from Cell B and a fourth parameter PAGING_GROUP_1B is a PAGING_GROUP for subscription Sub 1 using broadcast parameters from Cell B. A fifth parameter CCCH_GROUP_2A is a CCCH_GROUP for subscription Sub 2 using broadcast parameters from Cell A and a sixth parameter PAGING_ GROUP_2A is a PAGING_GROUP for subscription Sub 2 using broadcast parameters from Cell A. Further, a seventh parameter CCCH_GROUP_2B is a CCCH_GROUP for subscription Sub 2 using broadcast parameters from Cell B and an eighth parameter PAGING_GROUP_2B is a PAGING_GROUP for subscription Sub 2 using broadcast parameters from Cell B.

If first parameter CCCH_GROUP_1A is equal to fifth parameter CCCH_GROUP_2A and second parameter PAGING_GROUP_1A is equal to sixth parameter PAGING_GROUP_2A, or if third parameter CCCH_GROUP_1B is equal to seventh parameter CCCH_GROUP_2B and fourth parameter PAGING_GROUP_1B is equal to eighth parameter PAGING_GROUP_2B, then mobile device 402 may share paging messages from one cell with both subscriptions Sub 1 and Sub 2.

Figure 10:
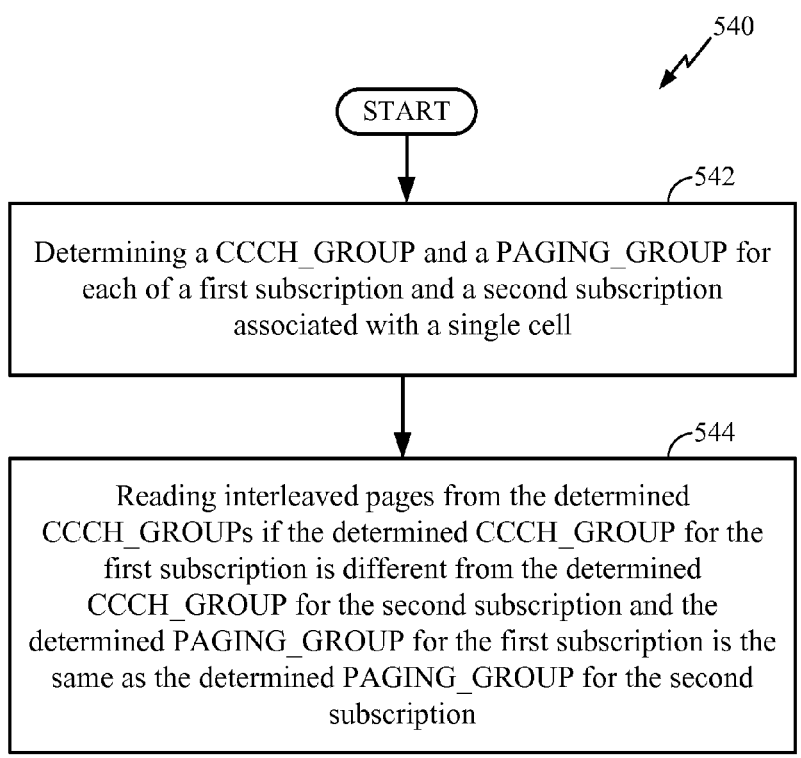
FIG. 10 is a flowchart depicting another method, in accordance with an exemplary embodiment of the present invention.

FIG. 10 is a flowchart illustrating a method 540, in accordance with one or more exemplary embodiments. Method 540 may include determining a CCCH_GROUP and a PAGING_GROUP for each of a first subscription and a second subscription associated with a single cell (depicted by numeral 542). Method 540 may further include reading interleaved pages from determined CCCH_GROUPs if the determined CCCH_GROUP for the first subscription is different from the determined CCCH_GROUP for the second subscription and a determined PAGING_GROUP for the first subscription is the same as a determined PAGING_GROUP for the second subscription (depicted by numeral 544).

Figure 11:
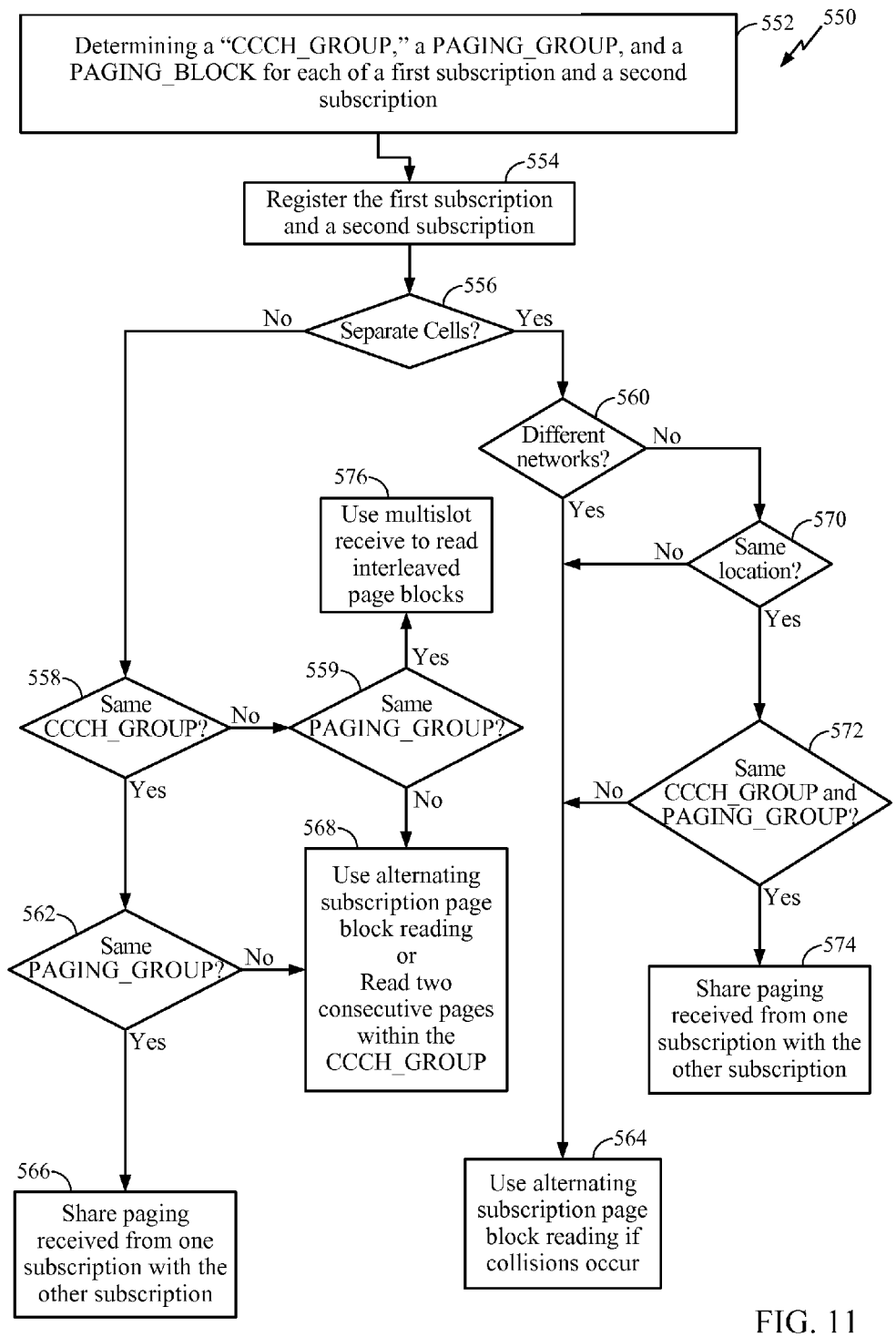
FIG. 11 is a flowchart depicting yet another method, in accordance with an exemplary embodiment of the present invention.

FIG. 11 is a flowchart illustrating yet another method 550, in accordance with one or more exemplary embodiments. Method 550 may include determining a CCCH_GROUP, a PAGING_GROUP, and a PAGING_BLOCK for each of a first subscription and a second subscription (depicted by numeral 552). Method 550 may further include registering the first subscription and the second subscription (depicted by numeral 554). Further, method 550 may include determining whether the first subscription and the second subscription are on separate cells or a single cell (depicted by numeral 556). If the first subscription and the second subscription are not on separate cells, proceed to step 558. If the first subscription and the second subscription are on the same cell, proceed to step 560.

From step 558, method 550 includes determining whether the first subscription and the second subscription have the same CCCH_GROUP (depicted by numeral 558). If so, method 550 proceeds to step 562. If the first subscription and the second subscription have a different CCCH_GROUP, method 550 proceeds to step 559. From step 562, method 550 includes determining whether the first subscription and the second subscription have the same PAGING_GROUP (depicted by numeral 562). If so, method 550 proceeds to step 566. If the first subscription and the second subscription have a different PAGING_GROUP, method 550 proceeds to step 568.

Reverting back to step 559, method 550 includes determining whether the first subscription and the second subscription have the same PAGING_GROUP (depicted by numeral 559). If so, method 550 proceeds to step 576. If the first subscription and the second subscription have a different PAGING_GROUP, method 550 proceeds to step 568.

Reverting back to step 560, method 550 may include determining whether the first subscription and the second subscription are assigned to different networks (depicted by numeral 560). If so, method 550 proceeds to step 564. If the first subscription and the second subscription are not assigned to different networks, method 550 proceeds to step 570 where it is determined whether the two different cells are within a common location area (depicted by numeral 570). If so, method 550 proceeds to step 572 where it is determined whether a CCCH_GROUP and a PAGING_GROUP for the first subscription are respectively the same as a determined CCCH_GROUP and a PAGING_GROUP for the second subscription. If so, method 550 proceeds to step 574. If not, method 550 proceeds to step 564. If not, method 550 proceeds to step 564. Reverting back to step 570, if the two different cells are not within a common location area, method 550 proceeds to step 564.

Although various exemplary embodiments presented herein are described with reference to page handling techniques in GSM+GSM Dual SIM capable devices, the exemplary embodiments are also applicable for WCDMA+WCDMA, and CDMA2000+CDMA200 capable multi SIM devices as well.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method, comprising:
   determining whether a first subscription and a second subscription are on separate cells;
   determining whether the separate cells are within a common location;
   detecting a paging collision scenario between the first subscription and the second subscription; and
   modifying a page reading operation of at least one of the first subscription or the second subscription to avoid a paging collision between the first subscription and the second subscription, the modifying comprising:
      reading alternative subscription page blocks from a determined common control channel configuration group if the determined common control channel configuration group for the first subscription is the same as the determined common control channel configuration group for the second subscription and a determined paging group for the first subscription is not the same as a determined paging group for the second subscription, and the separate cells are within the common location; and
      sharing paging information from the first subscription or the second subscription if the determined common control channel configuration group for the first subscription is the same as the determined common control channel configuration group for the second subscription and the determined paging group for the first subscription is the same as the determined paging group for the second subscription, and the separate cells are within the common location.

2. The method of claim 1, further comprising:
   determining that the common control channel configuration group for the first subscription is the same as the determined common control channel configuration group for the second subscription: and
   determining that the paging group for the first subscription is not the same as the determined paging group for the second subscription.

3. The method of claim 1, wherein detecting a paging collision comprises detecting a paging collision between the first subscription and the second subscription associated with the single cell.

4. The method of claim 1, wherein detecting a paging collision comprises detecting a paging collision between the first subscription and the second subscription having different subscription identities.

5. The method of claim 1, wherein detecting a paging collision comprises detecting a paging collision between the first subscription and the second subscription having adjacent page blocks.

6. A device, comprising:
   means for determining whether a first subscription and a second subscription are on separate cells;
   means for determining whether the separate cells are within a common location;
   means for detecting a potential paging collision between the first subscription and the second subscription; and
   means for modifying a page reading operation of at least one of the first subscription or the second subscription to avoid a paging collision between the first subscription and the second subscription, the means for modifying comprising:
      means for reading alternative subscription page blocks from a determined common control channel configuration group if the determined common control channel configuration group for the first subscription is the same as the determined common control channel configuration group for the second subscription and a determined paging group for the first subscription is not the same as a determined paging group for the second subscription, and the separate cells are within the common location; and
      means for sharing paging information from the first subscription or the second subscription if the determined common control channel configuration group for the first subscription is the same as the determined common control channel configuration group for the second subscription and the determined paging group for the first subscription is the same as the determined paging group for the second subscription, and the separate cells are within the common location.

7. The device of claim 6, further comprising:
   means for determining that the common control channel configuration group for the first subscription is the same as the determined common control channel configuration group for the second subscription: and
   means for determining that the paging group for the first subscription is not the same as the determined paging group for the second subscription.

8. The device of claim 6, wherein the means for detecting comprises means for detecting a paging collision between the first subscription and the second subscription associated with the single cell.

9. The device of claim 6, wherein the means for detecting comprises means for detecting the potential paging collision between the first subscription and the second subscription having different subscription identities.

10. The device of claim 6, wherein the means for detecting comprises means for detecting the potential paging collision between the first subscription and the second subscription having adjacent page blocks.

11. A non-transitory computer-readable medium including computer-executable instructions, which when executed on a computer, perform the acts comprising:
   determining whether a first subscription and a second subscription are on separate cells;
   determining whether the separate cells are within a common location;
   detecting a potential paging collision between the first subscription and the second subscription; and
   modifying a page reading operation of at least one of the first subscription or the second subscription to avoid a paging collision between the first subscription and the second subscription, the modifying comprising:
      reading alternative subscription page blocks from a determined common control channel configuration group if the determined common control channel configuration group for the first subscription is the same as the determined common control channel configuration group for the second subscription and a determined paging group for the first subscription is not the same as a determined paging group for the second subscription, and the separate cells are within the common location; and
      sharing paging information from the first subscription or the second subscription if the determined common control channel configuration group for the first subscription is the same as the determined common control channel configuration group for the second subscription and the determined paging group for the first subscription is the same as the determined paging group for the second subscription, and the separate cells are within the common location.

12. The non-transitory computer-readable medium of claim 11, wherein the instructions further perform the acts comprising:
   determining that the common control channel configuration group for the first subscription is the same as the determined common control channel configuration group for the second subscription: and
   determining that the paging group for the first subscription is not the same as the determined paging group for the second subscription.

13. The non-transitory computer-readable medium of claim 11, wherein detecting comprises detecting a paging collision between the first subscription and the second subscription associated with the single cell.

14. The non-transitory computer-readable medium of claim 11, wherein detecting comprises detecting the potential paging collision between the first subscription and the second subscription having adjacent page blocks.

15. A method, comprising:
   determining whether a first subscription and a second subscription are on separate cells;
   determining whether the separate cells are within a common location;
   determining a common control channel configuration group and a paging group for each of the first subscription and the second subscription associated with the single cell;
   reading alternative subscription page blocks from a determined common control channel configuration group if the determined common control channel configuration group for the first subscription is the same as the determined common control channel configuration group for the second subscription and a determined paging group for the first subscription is not the same as a determined paging group for the second subscription, and the separate cells are within the common location; and
   sharing paging information from the first subscription or the second subscription if the determined common control channel configuration group for the first subscription is the same as the determined common control channel configuration group for the second subscription and the determined paging group for the first subscription is the same as the determined paging group for the second subscription, and the separate cells are within the common location.

16. The method of claim 15, further comprising detecting a potential paging collision between the first subscription and the second subscription.

17. The method of claim 16, wherein detecting a potential paging collision comprises detecting the potential paging collision between the first subscription and the second subscription having adjacent page blocks.

18. The method of claim 15, the determining comprising determining a common control channel configuration group and a paging group for a first subscription having a subscription identity different than a subscription identity of the second subscription.

* * * * *